United States Patent [19]
Watkins

[11] Patent Number: 6,058,979
[45] Date of Patent: May 9, 2000

[54] SUBSEA PIPELINE INSULATION

[75] Inventor: Lou W. Watkins, Stoughton, Mass.

[73] Assignee: Cuming Corporation, Avon, Mass.

[21] Appl. No.: 09/120,676

[22] Filed: Jul. 22, 1998

Related U.S. Application Data

[60] Provisional application No. 60/053,526, Jul. 23, 1997.

[51] Int. Cl.$^7$ ........................................................ F16L 9/14
[52] U.S. Cl. ........................ 138/149; 138/114; 428/36.5
[58] Field of Search ........................... 138/149, 114, 138/113, 112; 428/36.5

[56] References Cited

U.S. PATENT DOCUMENTS

| | | | |
|---|---|---|---|
| 3,622,437 | 11/1971 | Hobaica et al. | 428/34.5 |
| 3,729,756 | 5/1973 | Cook et al. | 441/133 |
| 3,744,016 | 7/1973 | Davis | 307/154 |
| 3,900,543 | 8/1975 | Davis | 264/45.3 |
| 3,935,632 | 2/1976 | Maxon | 138/149 X |
| 3,996,654 | 12/1976 | Johnson | 29/458 |
| 4,021,589 | 5/1977 | Copley | 428/68 |
| 4,040,165 | 8/1977 | Miessler et al. | 138/149 X |
| 4,065,150 | 12/1977 | Van Auken | 280/610 |
| 4,194,536 | 3/1980 | Stine et al. | 138/149 |
| 4,330,685 | 5/1982 | Bleikamap, Jr. | 174/101.5 |
| 4,348,243 | 9/1982 | Craubner | 156/71 |
| 4,464,082 | 8/1984 | Issacs | 405/157 |
| 4,474,129 | 10/1984 | Watkins et al. | 114/243 |
| 4,477,207 | 10/1984 | Johnson | 405/195.1 |
| 4,482,590 | 11/1984 | Bouley et al. | 428/36.5 |
| 4,522,578 | 6/1985 | Martin, Jr. et al. | 425/110 |
| 4,568,603 | 2/1986 | Oldham | 428/295 |
| 4,590,971 | 5/1986 | Webster et al. | 138/149 |
| 4,595,623 | 6/1986 | Du Pont et al. | 428/195 |
| 4,657,050 | 4/1987 | Patterson | 138/149 |
| 4,659,253 | 4/1987 | Jacobson | 405/171 |
| 4,660,861 | 4/1987 | Argy et al. | 138/149 X |
| 4,676,695 | 6/1987 | Duthweiler | 405/157 |
| 4,698,887 | 10/1987 | Patell et al. | 29/890.14 |
| 4,744,842 | 5/1988 | Webster et al. | 156/78 |
| 4,768,455 | 9/1988 | Maxson et al. | 114/264 |
| 4,900,488 | 2/1990 | Collins et al. | 264/45.7 |
| 4,963,420 | 10/1990 | Jarrin et al. | 428/36.9 |
| 5,094,111 | 3/1992 | Collins et al. | 73/834 |
| 5,115,103 | 5/1992 | Yamanishi et al. | 174/24 |
| 5,158,727 | 10/1992 | Colemann-Kammula et al. | 264/109 |
| 5,432,205 | 7/1995 | Arnold, Jr. et al. | 521/54 |
| 5,476,343 | 12/1995 | Summer | 405/157 |
| 5,597,522 | 1/1997 | Curzon et al. | 264/177.16 |

FOREIGN PATENT DOCUMENTS 2244490A 12/1991 United Kingdom .

*Primary Examiner*—Patrick Brinson
*Attorney, Agent, or Firm*—Samuels, Gauthier & Stevens, LLP

[57] ABSTRACT

A deep sea insulated pipeline comprises an inner pipe which is encased lengthwise by an insulating core. The insulating core comprises macrospheres surrounded by syntactic foam that includes a semi-rigid resin binder and microspheres. The semi-rigid resin binder reinforces the macrospheres to provide sufficient strength to withstand the hydrostatic pressure at depths in excess of several thousand feet of water, and is yet flexible enough to accommodate bending associated with deep sea pipe laying operations. The deep sea insulated pipeline may also include a protective outer casing. The inner pipe extends through and cooperates with the outer casing to define an annulus chamber containing the insulating core. The outer casing may be a plastic pipe. In a preferred embodiment the semi-rigid resin binder includes Bisphenol-A epoxy resin, an anhydride curing agent, and a flexibilizer.

8 Claims, 4 Drawing Sheets

SUBSEA PIPELINE INSULATION

CROSS REFERENCE TO RELATED APPLICATIONS

This application claims priority from the provisional application designated serial number 60/053,526, filed Jul. 23, 1997 and entitled "Subsea Pipeline Insulation".

BACKGROUND OF THE INVENTION

The invention relates to the field of insulated pipelines, and in particular to the field of subsea pipelines suitable for use in deep water.

The resistance to flow of liquid products such as oil increases as temperature decreases. This problem can be reduced by using thermally insulated pipelines. However, for offshore pipelines it has usually been more cost effective to reduce the need for insulation by injecting various chemicals into the product.

However, more and more oil and gas is being recovered in deeper, colder water, from subsea production systems where use of viscosity reducing chemicals requires a dedicated line to transport them to the wellhead. This, combined with the fact that the cost of insulating pipelines typically increases with depth, indicates that insulated pipelines are most expensive where the alternatives are least attractive.

Prior art insulation used in undersea pipelines include porous plastic foam, such as polyurethane foam. As known, the lower the density of this insulating material, the higher percentage of air within the material, and therefore the more efficient it is as an insulator. However, as the insulating ability of the material increases due to decreased density, the weaker the material becomes. Specifically, as the density decreases so does the depth at which the foam cellular structure can operate in. Generally, prior wait insulators fail in a few hundred feet of water due to the hydrostatic pressure on the insulation. So the design tradeoff comes down to how light an insulator can be placed onto the surface of the pipe and have it withstand the hydrostatic pressure and other stresses, and at the same time provide the necessary thermal insulation for a long period of time.

These prior art insulators worked in the past because the operational depth of the pipeline was rather shallow. However, the oil industry has undergone a vary rapid movement into deeper water. Several years ago the deepest producing oil well was in approximately fifteen hundred feet of water. The deepest oil well producing today is in four thousand feet of water. The deepest producing oil well planned for two years from today is in ten thousand feet of water. Significantly, as the operating depth increases these relatively lightweight, low cost, low strength prior art materials become unsuitable. Specifically, the materials can no longer withstand the hydrostatic pressure and become saturated with water, thus undesirably becoming a thermal conductor rather than an insulator.

The use of syntactic foams has been discussed as an insulator suitable for deep-sea pipeline insulation. As known, syntactic foams are composite materials in which hollow structures, such as microspheres are dispersed in a resin matrix. However, in any practical manufacturing situation microspheres can not be introduced into the foam in a sufficient quantity to provide the requisite thermal insulation. In addition, the resin binders which hold the microspheres in conventional syntactic foams are too rigid to sustain the bending associated with conventional pipeline laying techniques.

Therefore, there is a need for an insulator which provides sufficient insulation for deep sea operation, and yet is flexible enough to withstand the bending associated with pipe laying operations.

SUMMARY OF THE INVENTION

An object of the present invention is to provide an insulator suitable for deep sea operation.

Briefly, according to the present invention, a deep sea insulated pipeline comprises an inner pipe which is encased lengthwise by an insulating core. The insulating core comprises macrospheres surrounded by syntactic foam that includes a semi-rigid resin binder and microspheres. The semi-rigid resin binder reinforces the macrospheres to provide sufficient strength to withstand the hydrostatic pressure at depths in excess of several thousand feet of water, and is yet flexible enough to accommodate bending associated with deep sea pipe laying operations.

The deep sea insulated pipeline may also include a protective outer casing. The inner pipe extends through and cooperates with the outer casing to define an annulus chamber containing the insulating core. The outer casing may be a plastic pipe.

In a preferred embodiment the semi-rigid resin binder includes Bisphenol-A epoxy resin, an anhydride curing agent, and a flexibilizer. In the syntactic foam these ingredients may have parts-by-weight (pbw) of approximately 100 pbw, 100 pbw, and 35–45 pbw, respectively, for 35 pbw of microspheres, where the ratios are with respect to the weight of the syntactic foam.

The macrospheres are preferably fiberglass, sealed, seamless, hollow, air and water tight spheres of about 0.25–0.5 inches in diameter. Other high strength advanced composite type fibers (e.g., carbon fibers, aramid, etc.) may also be used rather than fiberglass.

Advantageously, the deep sea pipeline insulation of the present invention has insulating properties 2–10 times better than the prior art as measured according to ASTM standard C-518, and yet is sufficiently flexible to sustain the bending which is known to occur in conventional pipe laying. That is, the syntactic foam is a partially flexible material that combines sufficient rigidity to support the macrospheres with conformal ability approaching that of an elastomeric insulator.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
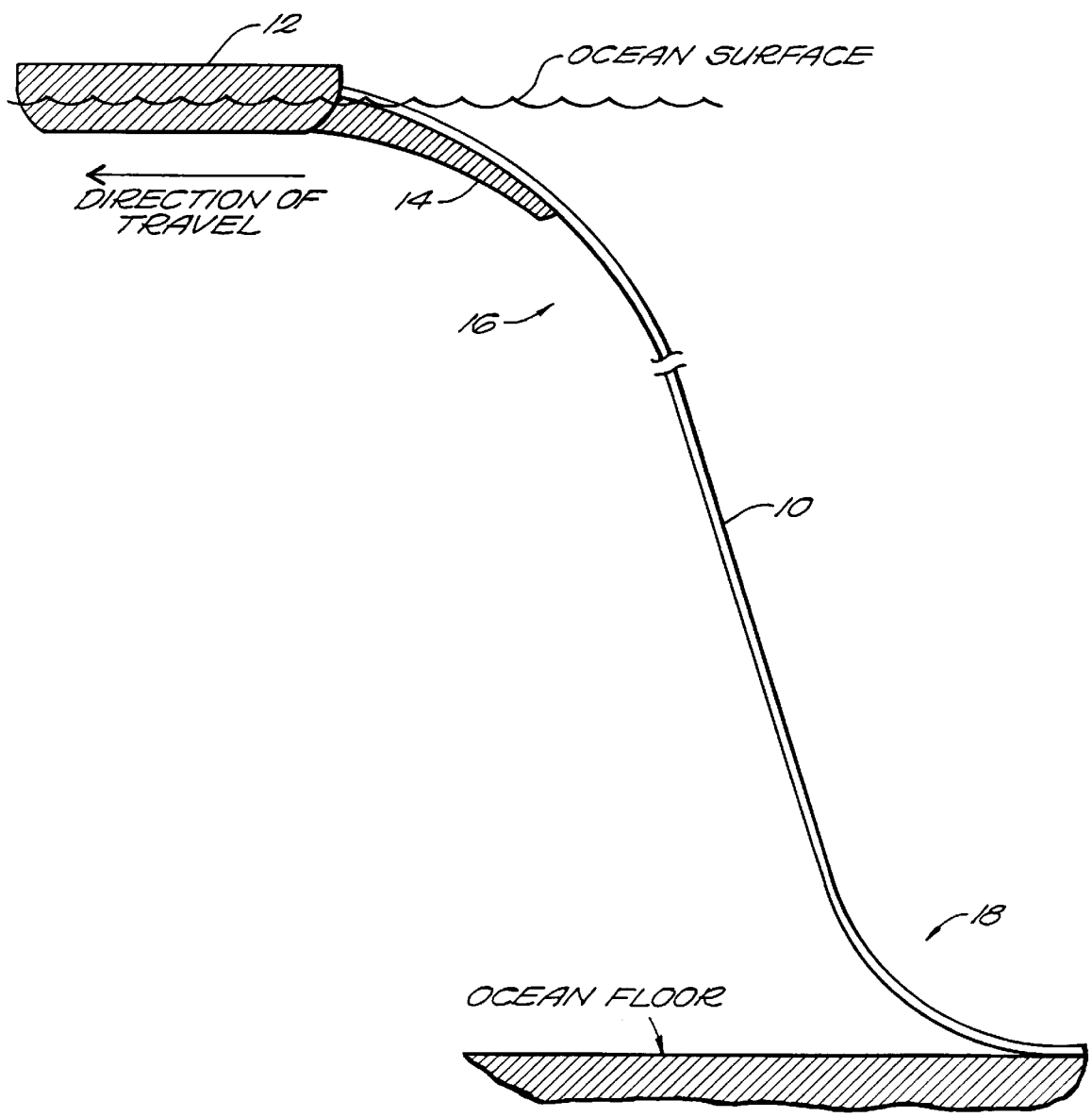
FIG. 1 illustrates a pictorial illustration of a deep sea pipe laying operation.

FIG. 1 is a pictorial illustration of deep sea pipeline laying operation. Lengths of insulated pipe 10 are interconnected on a lay barge 12 and the lengths exit the barge along a stinger 14 which is a downwardly curved pipe exit ramp. As the barge 12 moves along, the insulated pipeline eventually comes to rest on the ocean floor. Significantly, as the pipeline is being laid it is subject to a first bend 16 near the surface of the water and a second bend 18 above the ocean floor. This technique is often referred to as an "S-curve lay".

Figure 2:
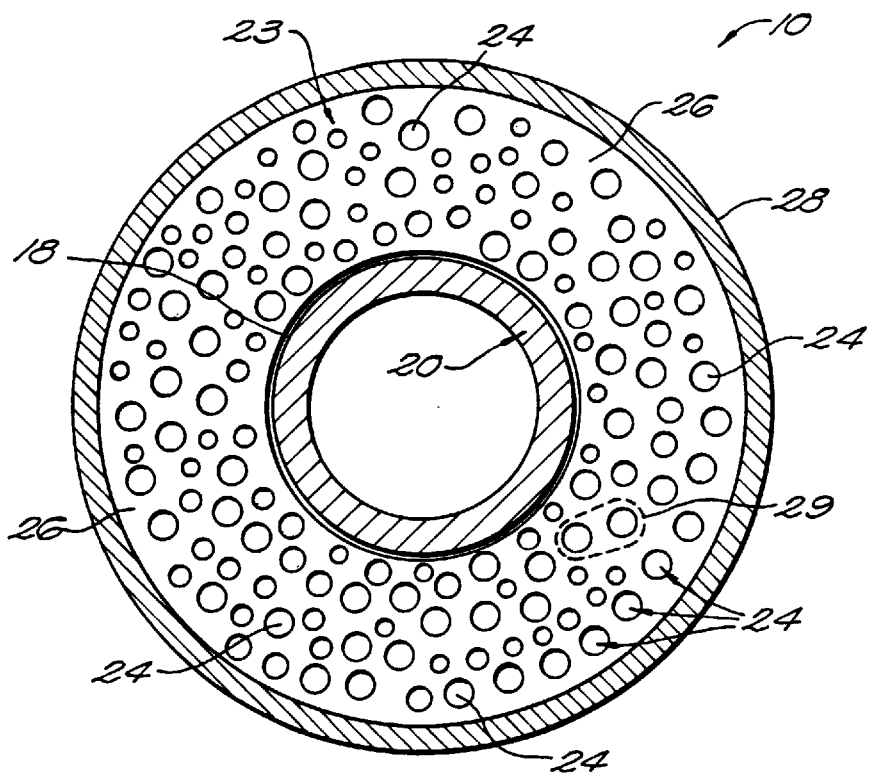
FIG. 2 illustrates a cross sectional view of an insulated pipe according to the present invention.

FIG. 2 is a cross sectional illustration of the insulated pipe 10. The insulated pipe 10 includes an inner pipe 20 that is typically steel and has a diameter of about 4 to 6 inches and a wall thickness typically 0.25 to 0.5 inches. The pipe 20 is often referred to as "flow line" because oil or gas, or in most cases a combination of the two pass through the pipe. To protect the pipe 20 from the corrosive effects of sea water, a thin anti-corrosion barrier of plastic film 18 or a paint like coating covers the exterior of the pipe 20. Outside of that is an insulating core 23 that comprises a plurality of fiber reinforced macrospheres 24 surrounded by a syntactic foam 26.

Figure 2A:
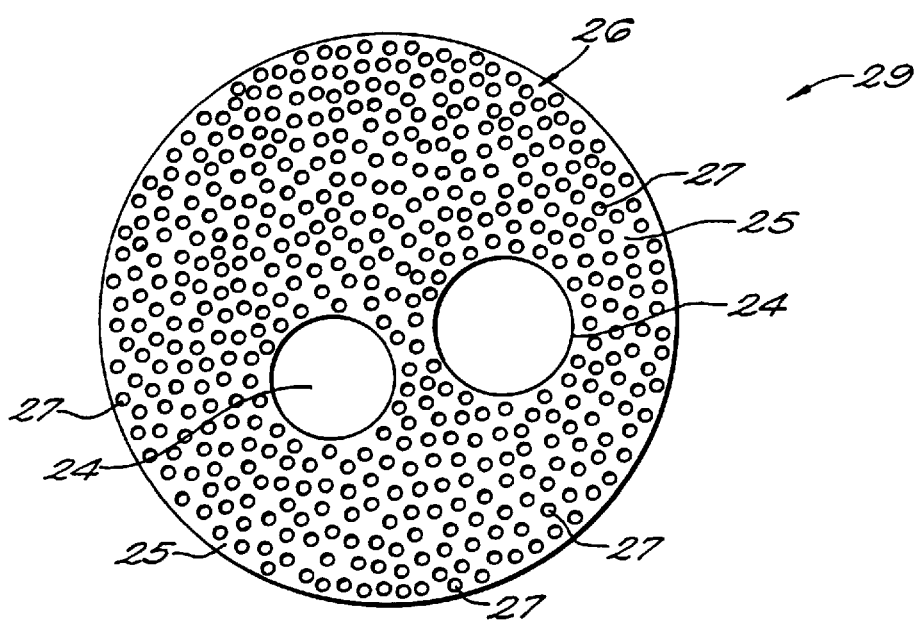
FIG. 2A illustrates an exploded cross sectional view of the insulating core and macrospheres within the annulus.

FIG. 2A illustrates a cross sectional view of an exploded area 29 shown in FIG. 2. The area 29 includes macrospheres 24 and the syntactic foam 26. The syntactic foam 26 includes a semi-rigid resin binder 25 containing microspheres 27. It should be noted that when viewed in three dimensions, the macrospheres actually contact adjacent macrospheres, and the voids between these spheres are filled by the syntactic foam 26.

The syntactic foam 26 reinforces the macrospheres 24 to provide sufficient strength to withstand the hydrostatic pressure at depths in excess of several thousand feet of water, and is yet flexible enough to accommodate the bending associated with deep sea pipe laying operations. The insulating core 23 has a radial thickness ranging from 1 to 3 inches. The thickness is dependent upon the depth at which the pipeline is designed to operate. The semi-rigid syntactic foam shall be discussed in detail hereinafter.

The macrospheres 24 are generally spherical shaped and have a diameter of about 0.25 to 0.5 inches. The walls are preferably fiberglass and have thickness dependent upon the operational depth. Specifically, the greater the operational depth of the pipeline, the greater the wall thickness required to sustain the hydrostatic pressure at that depth. For example, at depths where the hydrostatic pressure is a thousand psi or less, the wall thickness may be quite thin (e.g., 0.01 inches). In contrast, at ten thousand feet where the hydrostatic pressure approaches 5,000 psi the wall thickness is increased significantly (e.g., 0.03 inches). It is contemplated that other high strength advanced composite type fibers (e.g., carbon fibers, aramid, etc.) may also be used rather than fiberglass.

The microspheres 27 interspersed within the semi-rigid resin binder 25 are typically about 100 microns in diameter (i.e., 0.004") hollow spheres generally containing a gas which may be atmospheric air, although it may be richer in nitrogen than atmospheric air. The microspheres 27 have a wall thickness of about one micron. As known, the microspheres are manufactured by blowing glass in a furnace in the presence of blowing agents that cause the glass to bubble.

To provide the desired strength to withstand the crushing hydrostatic pressure, the macrospheres 24 are interspersed throughout the syntactic foam 26. Significantly, the syntactic foam 26 surrounds the macrospheres to provide a semi-rigid resin matrix which raises the strength of the macrospheres in contrast to their strength in the absence of the syntactic foam. For example, testing has shown that the macrospheres 24 exhibit a crush strength approximately two times greater when encapsulated in syntactic foam, then they would otherwise exhibit if unreinforced. The insulated pipeline 10 also includes a protective outer casing 28 (e.g., a polypropylene pipe) which is approximately 12" in diameter. We shall now discuss a process for insulating a deep sea pipe.

Figures 3A, 3B:
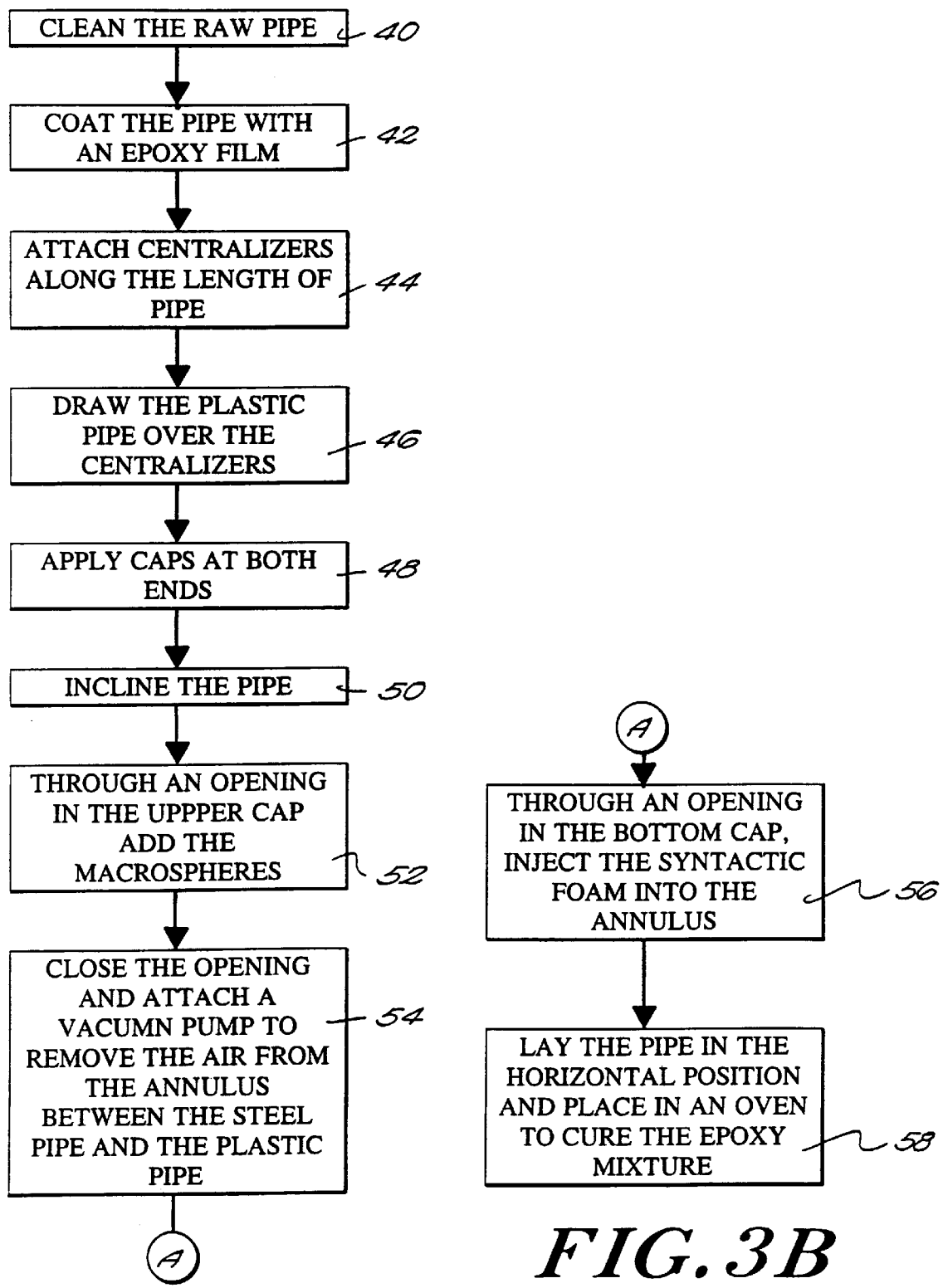
FIG. 3A–3B together provide a flow chart illustration of a method for insulating a length of pipe.

FIGS. 3A and 3B together provide a flow chart illustration of a method for insulating a deep sea pipe. In step 40 the exterior surface of a length of pipe (e.g., forty feet) is cleaned to remove corrosion and scale products. The cleaning may be performed by sandblasting the metallic pipe to provide a clean, bare steel substrate to work with. Step 42 is then performed to apply an epoxy anti-corrosion coating to the surface of the cleaned pipe. As a result, the exterior is a clean plastic surface which is well bonded to the steel pipe.

Figure 4:
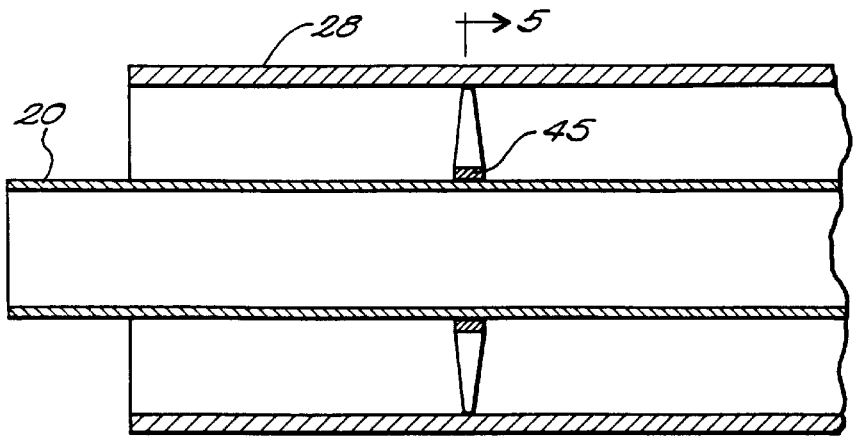
FIG. 4 is a lengthwise cross sectional view of the insulated pipeline.
Figure 5:
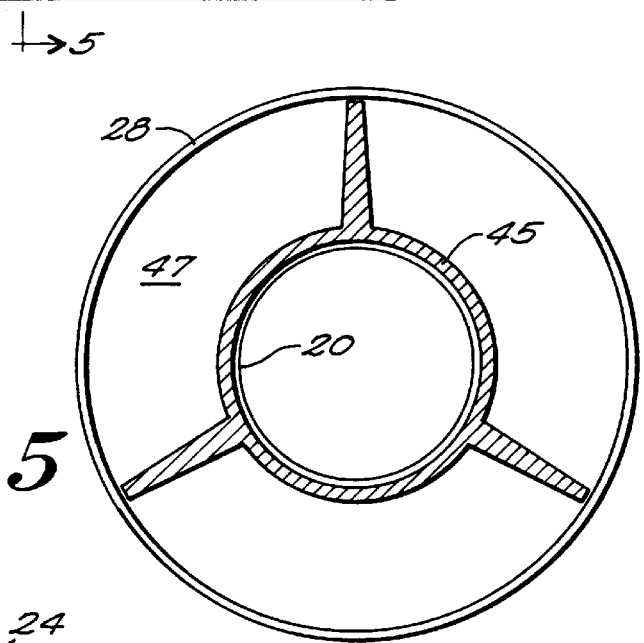
FIG. 5 is a cross sectional view taken along line 5—5 in FIG. 4.

Referring now to FIGS. 3A, 4 and 5, a plurality of centralizer supports 45 are then attached at several places along the cleaned length of pipe 20. The centralizers 45 are spider-like devices that coaxially center the inner pipe 20 within the outer pipe 28. In step 46 the outer pipe 28 is drawn over the centralizer supports 45 to thereby define an annulus 47 between the inner pipe 20 and the outer pipe 28. The outer pipe 28 is preferably several feet shorter than the inner pipe 20 in order to leave 12–24 inches of the inner pipe exposed on each end. The radial depth of the annulus may be about 1 to 3 inches, which represents the radial distance between the exterior of the inner pipe and the interior of the outer pipe.

Step 48 is then performed to apply caps at both ends of the covered pipe to seal the annulus. The capped pipe is then inclined 30–45° in step 50. In step 52 the fiberglass macrospheres 24 (FIG. 2) are deposited through an opening in the upper cap until the macrospheres fill the annulus 47. The pipe may be agitated slightly with a vibrator. Alternatively, the operator may occasionally strike the pipe with a soft headed hammer to provide the necessary agitation to facilitate the flow of macrospheres through the annulus. In step 54 the upper cap is then sealed and a vacuum pump is attached to remove the air from the annulus through a filtered opening in the upper cap.

Referring now to FIG. 3B, in step 56 a mixer/reservoir containing the semi-rigid syntactic foam is attached to an opening in the lower cap through a conduit. The foam is then injected under pressure from the mixer into the bottom of the annulus. The vacuum pump attached to the filtered opening in the upper cap draws the syntactic foam through the annulus, filling the voids between the macrospheres. When the foam starts to exit through the filtered opening in the top, of the annulus is full. The pipe is then lowered to the horizontal position, the opening in the caps are sealed, and the pipe is placed into an oven where it is baked at about 200° F. for 48 hours, preferably about 6 hours, to cure epoxy within the resin binder. When the epoxy is cured, the end caps are removed and the resultant structure is a length of insulated pipe as shown in cross section in FIG. 2.

The semi-rigid syntactic foam includes several preferred ingredients which are identified in Table 1, along with the relative amount of each ingredient.

TABLE 1

| INGREDIENTS | TOTAL RANGE (parts-by-weight) |
|---|---|
| Bisphenol-A Epoxy Resin | 100 pbw |
| Anhydride Curing Agent | 85–150 pbw |
| Glass Microspheres | 25–50 pbw |
| Flexibilizer (e.g., Polybutadiene or Polyglycol) | 25–55 pbw |

In a preferred syntactic foam embodiment, the Bisphenol-A epoxy resin is 100 pbw, the anhydride curing agent is 100 pbw, the glass microspheres are 35 pbw and the flexibilizer is 35–45 pbw.

Significantly, the syntactic foam is strong enough to support the macrospheres and provide the requisite crush strength, while still flexible enough to sustain the bending while being laid. It is contemplated that various flexbilizers will provide the syntactic foam with the conformal ability approaching that of an elastomeric insulator. The "*Handbook of Epoxy Resin*" written by H. Lee and K. Neville and published by McGraw-Hill Book Company discusses a number of different flexibilizers.

To form the pipeline, lengths of insulated pipe are welded together. As shown in FIG. 4 a short distance (12–24 inches) of the inner pipe 20 is left uncovered by the insulating core 23 (FIG. 2) and the outer pipe 28. Molded half collars (not shown) of the insulating core material are then placed around the welded ends, and polyethylene or polypropylene is flame sprayed over the secured half collars. As a result, continuous lengths of insulated pipe can be provided. Generally, four lengths of pipe are welded together to make what is called a quadjoint, covered with insulating half collars and then flame sprayed with the polyethylene or polypropylene to provide a 160 foot insulated pipeline that is barged to the laying barge and connected to another 160 foot length piece on the laying barge.

Figure 6:
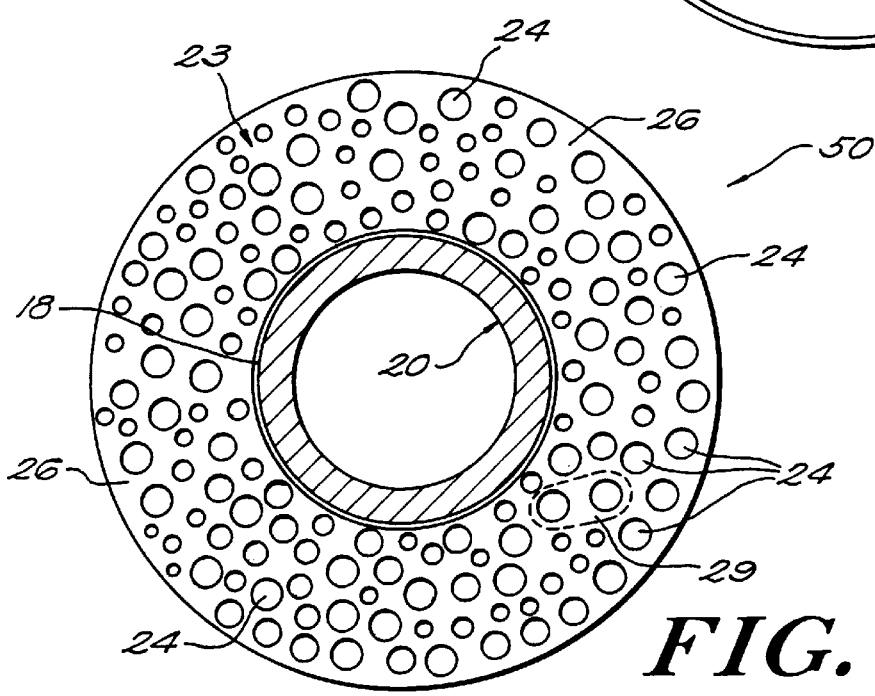
FIG. 6 is a cross sectional view of an alternative embodiment insulated pipe.

FIG. 6 is a cross sectional view of an alternative embodiment insulated pipe 50. This embodiment is substantially the same as the embodiment illustrated in FIG. 2, with the exception of the protective outer casing 28 (FIG. 2). Specifically, it is contemplated that the pipeline may be layed in a shallow man-made trench on the ocean floor. As a result the protective outer casing may not be required.

To manufacture the alternative embodiment insulated pipe 50, a mold may be placed around the inner pipe analogous to the protective pipe. The method set forth in FIGS. 3A and 3B can then be used to insulate the inner pipe, and following the curing step the mold would be remove leaving the cured insulating core at the exterior of the pipe.

One of ordinary skill will recognize that the present invention is clearly not limited to the pipe sizes discussed herein or the materials. For example, it is clearly contemplated that a wide variety of pipes of a wide variety of sizes and thickness will find it advantageous to use the insulator disclosed herein. In addition, it is contemplated that the syntactic foam may be extruded onto the inner pipe.

Although the present invention has been shown and described with respect to several preferred embodiments thereof, various changes, omissions and additions to the form and detail thereof, may be made therein, without departing from the spirit and scope of the invention.

What is claimed is:

1. An insulated pipeline, comprising:

an inner pipe; and an insulating core that encases lengthwise said inner pipe and comprises macrospheres surrounded by syntactic foam that includes a semi-rigid resin binder and microspheres, wherein said semi-rigid resin binder reinforces said macrospheres to provide sufficient strength to withstand the hydrostatic pressure at depths in excess of several thousand feet of water, and is yet sufficiently flexible to accommodate bending associated with deep sea pipe laying operations.

2. The insulated pipeline of claim 1, wherein said semi-rigid resin binder comprises Bisphenol-A epoxy, an anhydride curing agent and a flexibilizer.

3. The insulated pipeline of claim 1, wherein said syntactic foam includes about 35 parts-by-weight (pbw) of said microspheres, and about 100 pbw of Bisphenol-A epoxy resin, 85–150 pbw of anhydride curing agent, 25–55 pbw of flexibilizer.

4. The insulated pipeline of claim 3, further comprising:

an outer pipe co-axial with said inner pipe;

a plurality of centralizers which space said inner pipe and said outer pipe to define said annulus.

5. The insulated pipeline of claim 3, wherein said insulating core has a radial thickness greater than one inch.

6. The insulating pipe of claim 5, further comprising:

an outer pipe co-axial with said inner pipe;

wherein said outer pipe is several feet shorter than said inner pipe to leave a portion of said inner pipe exposed on each end.

7. The insulating pipe of claim 1, further comprising a cylindrical outer protective casing through which said inner pipe extends coaxially, establishing an annulus between said inner pipe and said outer protective casing, wherein said insulating core is located within said annulus.

8. A semi-rigid syntactic foam for use in deep sea operations, comprising about 35 parts-by-weight (pbw) of microspheres, about 100 pbw of Bisphenol-A epoxy resin, approximately 85–150 pbw of an anhydride curing agent and about 25–55 pbw of a flexibilizer.

* * * * *